(12) United States Patent
Shim et al.

(10) Patent No.: US 9,170,919 B2
(45) Date of Patent: Oct. 27, 2015

(54) APPARATUS AND METHOD FOR DETECTING LOCATION OF SOURCE CODE ERROR IN MIXED-MODE PROGRAM

(71) Applicant: Samsung Electronics Co., Ltd., Suwon-si (KR)

(72) Inventors: Hee-Jun Shim, Seoul (KR); Min-Wook Ahn, Seoul (KR); Jin-Sae Jung, Yongin-si (KR); Yen-Jo Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/019,812

(22) Filed: Sep. 6, 2013

(65) Prior Publication Data

US 2014/0075245 A1    Mar. 13, 2014

(30) Foreign Application Priority Data

Sep. 7, 2012    (KR) .......................... 10-2012-0099609

(51) Int. Cl.
*G06F 9/44*    (2006.01)
*G06F 11/36*    (2006.01)
*G06F 9/45*    (2006.01)

(52) U.S. Cl.
CPC ........ *G06F 11/3624* (2013.01); *G06F 11/3612* (2013.01); *G06F 11/3672* (2013.01); *G06F 8/41* (2013.01)

(58) Field of Classification Search
None
See application file for complete search history.

(56) References Cited

U.S. PATENT DOCUMENTS

| 5,313,616 | A | * | 5/1994 | Cline et al. ..................... 717/127 |
| 5,675,803 | A | * | 10/1997 | Preisler et al. ................. 717/131 |
| 6,071,316 | A | * | 6/2000 | Goossen et al. ............... 717/126 |
| 8,402,438 | B1 | * | 3/2013 | Andrews et al. ............... 717/126 |
| 2004/0015897 | A1 | * | 1/2004 | Thompson et al. ............ 717/140 |
| 2008/0052685 | A1 | * | 2/2008 | Jeong et al. ................... 717/136 |

(Continued)

FOREIGN PATENT DOCUMENTS

EP    2 096 539 A2    9/2009
KR    10-0403658    10/2003

(Continued)

OTHER PUBLICATIONS

Cmelik et al., "Shade: A Fast Instruction-Set Simulator for Execution Profiling," 1995, Fast Simulation of Computer Architectures, pp. 5-46.*

(Continued)

*Primary Examiner* — Thuy Dao
*Assistant Examiner* — Stephen Berman
(74) *Attorney, Agent, or Firm* — NSIP Law (57) ABSTRACT

An apparatus for detecting a source code error location in a mixed-mode program is disclosed. The apparatus may include a compiler, a mapping table generator, a simulator, a comparison data generator and an error location detector. The apparatus extracts low-level data while simulating a verification program and while simulating a reference program. The low-level data is mapped to mapping tables for a verification program and a reference program, and by comparing the tables it is determined if there is an error in the mixed-mode program and if so, where.

14 Claims, 9 Drawing Sheets (56) References Cited

U.S. PATENT DOCUMENTS

| | | | |
|---|---|---|---|
| 2008/0178045 A1* | 7/2008 | Son | 714/38 |
| 2009/0217249 A1* | 8/2009 | Kim et al. | 717/135 |
| 2012/0030652 A1* | 2/2012 | Jelinek | 717/124 |
| 2012/0117552 A1* | 5/2012 | Krishnaiyer et al. | 717/160 |
| 2012/0311467 A1* | 12/2012 | Bijani et al. | 715/760 |
| 2013/0346947 A1* | 12/2013 | Braverman et al. | 717/124 |

FOREIGN PATENT DOCUMENTS

| | | |
|---|---|---|
| KR | 10-2007-0062577 | 6/2007 |
| KR | 10-1019278 | 2/2011 |
| KR | 10-2011-0050725 | 5/2011 |
| WO | WO 99/21081 | 4/1999 |
| WO | WO 2006/045778 A1 | 5/2006 |
| WO | WO 2008/021763 A1 | 2/2008 |
| WO | WO 2010/060084 A2 | 5/2010 |

OTHER PUBLICATIONS

Hartenstein, "A decade of reconfigurable computing: a visionary retrospective," 2001, Proceedings of the conference on Design, automation and test in Europe, pp. 642-649.*

Corbett et al., "Bandera: extracting finite-state models from Java source code," 2000, Proceedings of the 2000 International Conference on Software Engineering, pp. 439-488.*

European Search Report issued Oct. 18, 2013 in counterpart European Application No. 13183532.4-1951.

Gupta, Rajiv, and Mary Lou Soffa. "A Matching Approach to Utilizing Fine-Grained Parallelism." *System Sciences vol. 1*, IEEE, (Jan. 1988) pp:148-156.

Smith, Lorna, and Mark Bull. "Development of mixed mode MPI/OpenMP applications." *Scientific Programming* 9.2 (Jan. 2001): pp: 83-98.

* cited by examiner

| <source code file name> | <line> | <variable name> | <reg.address>/<memory address> |
|---|---|---|---|
| ⋮ | ⋮ | ⋮ | ⋮ |
| main.c | 100 | A | R4 |
| FFT.c | 170 | fwd | 0×ff000000 |
| main.c | 101 | i | 10 |
| ⋮ | ⋮ | ⋮ | ⋮ |

FIG. 8

| <reg. address>/<memory address> | value |
|---|---|
| <reg. address>/<memory address> | value |
| <reg. address>/<memory address> | value |
| ⋮ | ⋮ |
| R4 | 0×0000ffff |
| 0×ff000000 | 0×10000000 |
| ⋮ | ⋮ | time=n, time=n+1, time=n+2, time

FIG. 9

APPARATUS AND METHOD FOR DETECTING LOCATION OF SOURCE CODE ERROR IN MIXED-MODE PROGRAM

CROSS-REFERENCE TO RELATED APPLICATION(S)

This application claims the benefit under 35 U.S.C. §119(a) of Korean Patent Application No. 10-2012-0099609 filed on Sep. 7, 2012, in the Korean Intellectual Property Office, the entire disclosure of which is incorporated herein by reference for all purposes.

BACKGROUND

1. Field

The following description relates to a multi-mode processing technology. For example, the following description relates to a technology for verifying mapped code in a mixed-mode program by a multi-mode reconfigurable processor, and a debugging technology to help find is source code errors.

2. Description of the Related Art

A reconfigurable architecture is an architecture that can alter the hardware configuration of a computing device based on the tasks to be performed by the computing device, thereby enabling optimization at the hardware level for each of the tasks. Such a capability is valuable because one piece of hardware is capable of performing multiple tasks well simply by changing settings of one piece of hardware, instead of requiring multiple pieces of hardware, each optimized for one task, or using a single piece of hardware that is not adaptable, and hence performs at least some of the tasks suboptimally.

When a task is processed using only hardware, it is difficult to efficiently handle even a slight alteration to the way in which tasks are performed, because most hardware is configured to function in a fixed way. On the other hand, when a task is processed using only software, it is possible to alter the software according to the nature of the task, and perform the task using the altered software. However, the task is processed slower than when the task is processed using fixed hardware, in that adapting software for various tasks may not be ideally adapted for optimal performance on the fixed hardware.

A reconfigurable hardware architecture offers the advantages of both hardware and software. More specifically, a reconfigurable hardware architecture ensures the optimal performance of customized hardware while providing the versatility of customized software. For these reasons, the use of reconfigurable architecture has increased, especially in the field of digital signal processing where the same tasks are often repeatedly performed and optimizing those tasks has a meaningful impact on the overall performance.

There are many kinds of reconfigurable architectures. A case in point is Coarse-Grained Array (CGA), which consists of a plurality of Processing Elements (PEs) connected to each other. By changing the way in which the PEs are connected to each other, the CGA may be optimized for performing a specific operation or task.

Recently, a new reconfigurable architecture has been developed, which utilizes a specific PE of a coarse-grained array as a Very Long Instruction Word (VLIW) machine. In such a reconfigurable architecture, there are two execution modes, a CGA mode and a VLIW mode. In a CGA mode, typically, one or more iterative loop operation are processed, and in VLIW mode, typically, general operations other than loop operations are processed. This approach is taken because the CGA mode may be more efficient for handling loops.

A reconfigurable processor based on the CGA has a very complex structure. Such a processor includes a plurality of Functional Units (FUs), a global register file, and a local register file.

If there is data dependency in the CGA, it is difficult for a compiler to analyze and process data. Data dependencies are important to identify because otherwise errors may occur if illegal or corrupted data is generated that does not satisfy the data dependencies. For example, if the compiler fails to overcome the data dependency, a user or programmer cannot even detect an error in binary data mapped in the CGA. As a result, an unintended result may be achieved during execution of a program. In order for reconfigurable hardware architecture to be a viable way of processing data, it must be able to avoid such runtime errors.

SUMMARY

In one general aspect, there is provided an apparatus for detecting a source code error location in a mixed-mode program, including a simulator configured to simulate a first program and to simulate a second program, a low-level data extractor configured to extract first low-level data from the simulation of the first program, and to extract second low-level data from the simulation of the second program, a comparison data generator configured to map the first low-level data onto a first mapping table generated from the first program to generate a verification mapping table, and to map the second low-level data onto a second mapping table generated from the second program to generate a reference mapping table, and an error location detector configured to compare the verification mapping table with the reference mapping table to detect an inconsistent record of data between the verification mapping table and the reference mapping table, and obtain program location information relating to the inconsistent record of data.

The apparatus may further include a compiler configured to generate the first program by compiling source code in a first mode, and the second program by compiling source code in a second mode.

The apparatus may further include a mapping table generator configured to generate the first mapping table for the first program, and the second mapping table for the second program.

The apparatus may provide that each of the first mapping table and the second mapping table includes at least one of instruction mapping information, register mapping information, and memory mapping information.

The low-level data extractor may be configured to extract low-level data from each of the first program and the second program of a predetermined time period during simulation.

The low-level data may include at least one of register data, memory data, program counter (PC), and iteration counter.

The error location detector may detect, based on the program counter, a location of the source code that causes an error.

In another aspect, there is provided a method for detecting a location of a source code error in a mixed-mode program, including simulating a verification program, simulating a reference program, extracting low-level data from the simulation of the verification program, extracting low-level data from the simulation of the reference program, mapping the low-level data extracted from the verification program onto a verification mapping table indicating a relationship between the source code and the verification program, to generate a verification mapping table, mapping the low-level data extracted from the reference program onto a reference mapping table indicating a relationship between the source code and the reference program, to generate a reference mapping table, and comparing the verification mapping table with the reference mapping table to detect an inconsistent record of data and obtain program location information relating to the inconsistent record of data.

The method may further include generating the verification program by compiling source code in a first mode, and generating the reference program by compiling source code in a second mode.

The method may further include generating the first mapping table indicating a relationship between the source code and a verification program, and generating the second mapping table indicating a relationship between the source code and the reference program.

In another aspect, there is provided a method for detecting a location of a source code error in a mixed-mode program, including generating a verification data table, generating a reference data table, and comparing the verification data table with the reference data table so as to determine whether there is an inconsistent record of data.

The method may further include detecting a location corresponding to the inconsistent record of data, if it exists, in the source code based on a program counter (PC) and a Functional Unit (FU) index.

The method may provide that the generating of the verification data table is performed by mapping low-level data of a verification program, which is compiled in a first mode, onto a mapping table for the verification program.

The method may provide that the generating of the reference data table is performed by storing low level data of a reference program, which is compiled in a second mode different from the first mode, onto a mapping table for the reference program.

The method may further include extracting the low-level data of the verification program from the verification program during simulation.

The method may further include extracting the low-level data of the reference program from the reference program during simulation.

In another aspect, there is provided an apparatus for validating source code in a mixed-mode program, including a simulator configured to simulate a first program and a second program, a low-level data extractor configured to extract first low-level data from the simulation of the first program, and to extract second low-level data from the simulation of the second program, a comparison data generator configured to map the first low-level data onto a first mapping table generated from the first program to generate a verification mapping table, and to map the second low-level data onto a second mapping table generated from the second mapping table to generate a reference mapping table, and an error location detector configured to compare the verification mapping table with the reference mapping table to provide an indication of whether the source code is valid.

In the apparatus, each of the first mapping table and the second mapping table may include at least one of instruction mapping information, register mapping information, and memory mapping information.

The low-level data extractor may be configured to extract low-level data from each of the first program and the second program of a predetermined time period during simulation.

The low-level data may include at least one of register data, memory data, program counter (PC), and iteration counter.

In one general aspect, there is provided an apparatus for detecting a source code error location in a mixed-mode program, including a simulator configured to simulate a first program, wherein the first program is generated by compiling source code in a first mode, and to simulate a second program, wherein the second program is generated by compiling the source code in a second mode, a low-level data extractor configured to extract first low-level data from the first program during simulation, and to extract second low-level data from the second program during simulation, a comparison data generator configured to map the first low-level data onto a first mapping table generated from the first program to thereby generate a verification mapping table, and to map the second low-level data onto a second mapping table generated from the second mapping table to thereby generate a reference mapping table, and an error location detector configured to compare the verification mapping table with the reference mapping table to determine whether there is an inconsistent record of data between the verification mapping table and the reference mapping table, and, in response to determining that there is an inconsistent record of data, obtain program location information relating to the inconsistent record of data.

The apparatus may provide that each of the first mapping table and the second mapping table includes at least one of instruction mapping information, register mapping information, and memory mapping information.

The low-level data extractor may be configured to extract low-level data from each of the first program and the second program of a predetermined time period during simulation.

The low-level data may include at least one of register data, memory data, program counter (PC), and iteration counter.

The error location detector may detect, based on the program counter, a location of the source code that causes an error.

In another aspect there is provided a method for detecting a location of a source code error in a mixed-mode program, including extracting low-level data from a verification program, wherein the verification program is generated by compiling source code in a first mode, while simulating the verification program, extracting low-level data from the reference program, wherein the reference program is generated by compiling source code in a second mode, while simulating the reference program, mapping the low-level data extracted from the verification program onto a verification mapping table indicating a relationship between the source code and the verification program, to thereby generate a verification mapping table, mapping the low-level data extracted from the reference program onto a reference mapping table indicating a relationship between the source code and the reference program, to thereby generate a reference mapping table; comparing the verification mapping table with the reference mapping table to determine whether there is an inconsistent record of data, and in response to determining that there is an inconsistent record of data, obtaining program location information relating to the inconsistent record of data.

In another aspect, there is provided a method for detecting a location of a source code error in a mixed-mode program, including generating a verification data table, generating a reference data table, and comparing the verification data table with the reference data table so as to determine whether there is an inconsistent record of data.

The method may further include detecting a location corresponding to the inconsistent record of data, if exists, in the source code based on a program counter (PC) and a Functional Unit (FU) index.

The method may further include that the generating of the verification data table is performed by mapping low-level data of a verification program, which is compiled in a first mode, onto a mapping table for the verification program.

The method may further include that the generating of the reference data table is performed by storing low level data of a reference program, which is compiled in a second mode different from the first mode, in a mapping table for the reference program.

The method may further include extracting the low-level data of the verification program from the verification program during simulation.

The method may further include extracting the low-level data of the reference program from the reference program during simulation.

In another aspect, there is provided an apparatus for validating source code in a mixed-mode program, including a simulator configured to simulate a first program, wherein the first program is generated by compiling source code in a first mode, and to simulate a second program, wherein the second program is generate by compiling the source code in a second mode, a low-level data extractor configured to extract first low-level data from the first program during simulation, and to extract second low-level data from the second program during simulation, a comparison data generator configured to map the first low-level data onto a first mapping table generated from the first program to thereby generate a verification mapping table, and to map the second low-level data onto a second mapping table generated from the second mapping table to thereby generate a reference mapping table, and an error location detector configured to compare the verification mapping table with the reference mapping table to determine whether there is an inconsistent record of data between the verification mapping table and the reference mapping table, and, in response to determining that there is no inconsistent record of data, provide an indication that the source code is valid.

The apparatus may provide that each of the first mapping table and the second mapping table comprises at least one of instruction mapping information, register mapping information, and memory mapping information.

The low-level data extractor may be configured to extract low-level data from each of the first program and the second program of a predetermined time period during simulation.

The low-level data may include at least one of register data, memory data, program counter (PC), and iteration counter.

Other features and aspects may be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be noted that the term "source code," as used herein, refers to one or more files of source code, which may optionally include libraries, which include instructions in at least one computer programming language to perform a series of steps by a computer. In embodiments, such source code is compiled so that it may be run on hardware.

Figure 1:
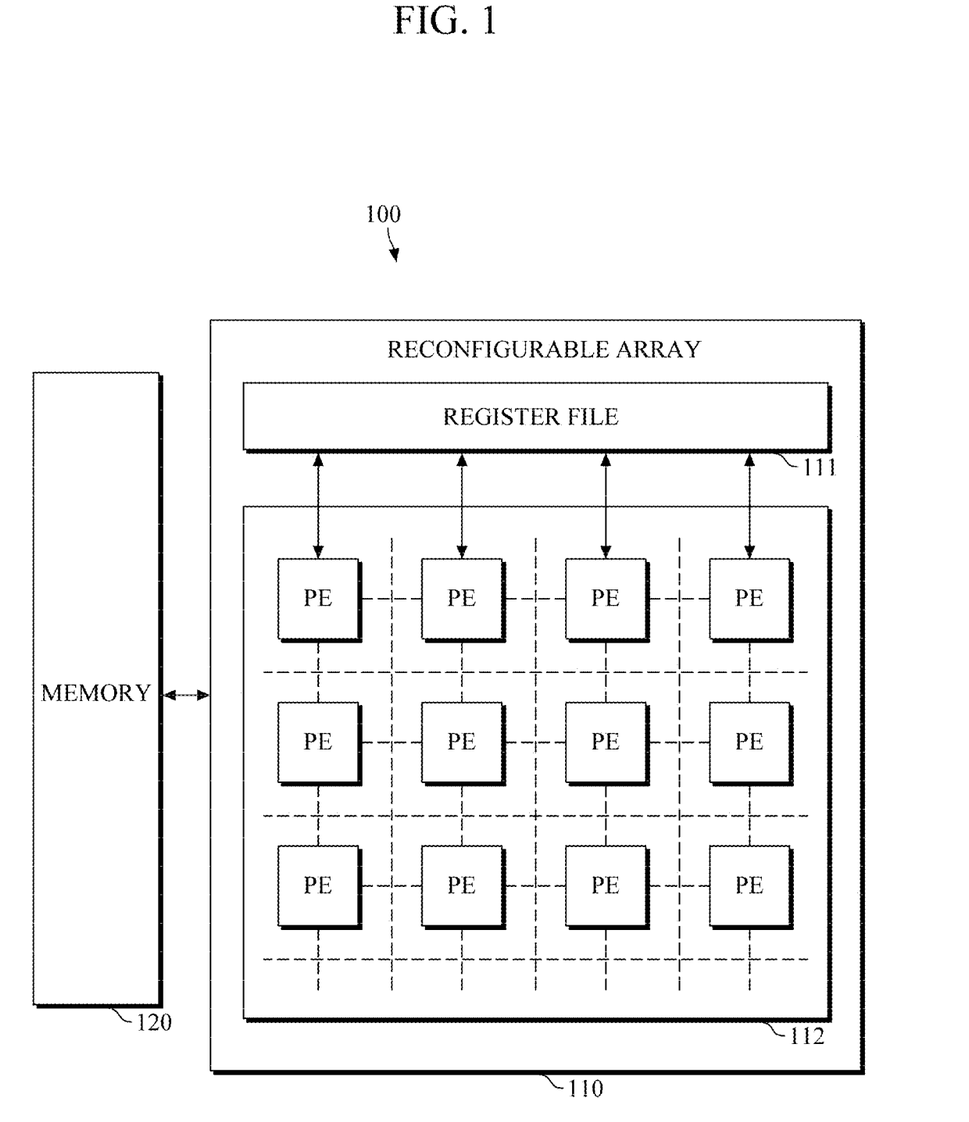
FIG. 1 is a diagram illustrating an example of a reconfigurable processor.

FIG. 1 is a diagram illustrating an example of a reconfigurable processor.

Referring to FIG. 1, a reconfigurable processor 100 includes a reconfigurable array 110 and a memory 120.

Herein, the term "iteration" indicates each execution of a loop operation. For example, when a loop is executed three times, the first, second, and third executions of the overall loop operation are referred to as the first, second, and third iterations of the loop operation. Instructions included in the same iteration may be mapped to different processing elements (PEs), and if the PEs operate simultaneously, the instructions mapped to different PEs may be processed in parallel, making the operational speed of the reconfigurable processor 100 faster. Various techniques exist for mapping instructions to multiple processing elements to allow for simultaneous execution of multiple tasks, such as multitasking and multithreading. Parallel processing is desirable because if multiple PEs are available and the processing is divided, this provides a way for tasks that can be started before other tasks have finished to reduce the overall time consumption to accomplish computing tasks.

In some embodiments, the reconfigurable processor 100 is able to be set to be driven either in a Coarse-Grained Array (CGA) mode or in a Very Long Instruction Word (VLIW) mode. For example, the reconfigurable processor 100 processes loop operations in a CGA mode, but can process both general operations and loop operations in a VLIW mode. Although the reconfigurable processor 100 is able to process a loop operation either in a CGA mode or in a VLIW mode, the efficiency of processing loop operations in a VLIW mode may be lower than the efficiency of processing loop operations in a CGA mode. In order to maximize efficiency in such a situation, an embodiment is configured to process loop operations in the CGA mode, which is a more efficient way of performing loop operations, and then process other operations in VLIW mode, as the CGA mode cannot handle those other operations. As a result, the reconfigurable processor 100 may be driven alternatively in a CGA mode and the VLIW mode during the execution of a particular program in order to achieve the best possible results for the performance of the program.

The reconfigurable array 110 includes a register file 111 and a plurality of Processing Elements (PEs) 112. In embodiments, the reconfigurable array 110 alters a hardware configuration to perform an operation optimally. For example, the reconfigurable array 110 may alter the way the PEs 112 are connected to each other and interact with one another, according to a type of operation. If the PEs are changed to be connected to one another in a different way, it changes the way in which the reconfigurable array 110 processes data, potentially in a way that is better adapted for a given kind of operation.

The register file 111 is used for data transfer between the PEs 112. The register file 111 acts as a working memory with which the PEs 112 can read and write data for use in processing tasks. In addition, the register file 111 may also store data required for executing an instruction. For example, each of the PEs 112 is able to access the register file 111 so as to read or write data required for executing an instruction. However, not every PE 112 is necessarily connected to all the other PEs 112 or connected directly to the register file 111, so a specific PE 112 may access the register file 111 via another PE 112.

Each of the PEs 112 may execute an assigned instruction. The way the PEs 112 are connected to each other, and the operation order of the PEs 112, may change according to a task to be processed. As discussed above, by changing the connections and ordering of PEs in a given architecture allows the PEs to be reconfigured in a way that adapts them to specific processing tasks.

The memory 120 may store information about the ways in which the PE 112 are connected to each other, information, such as instructions required for performing processing, and processing results. The instructions may be instructions to be provided to the reconfigurable array 110, such as operations that specify actions to be taken as part of a data processing method. For example, the memory 120 may store data to be processed, prior to being processed by the reconfigurable array 110, or a data processing result, generated by the reconfigurable array 110. In another example, the memory 120 may store information required for driving the reconfigurable processor 110, information about the way that the PE 112 included in the reconfigurable array 110 are connected to each other, and information about the way the plurality of PEs 112 included in the reconfigurable array 110 operate on the data and the results that the PEs 112 produce.

Figure 2:
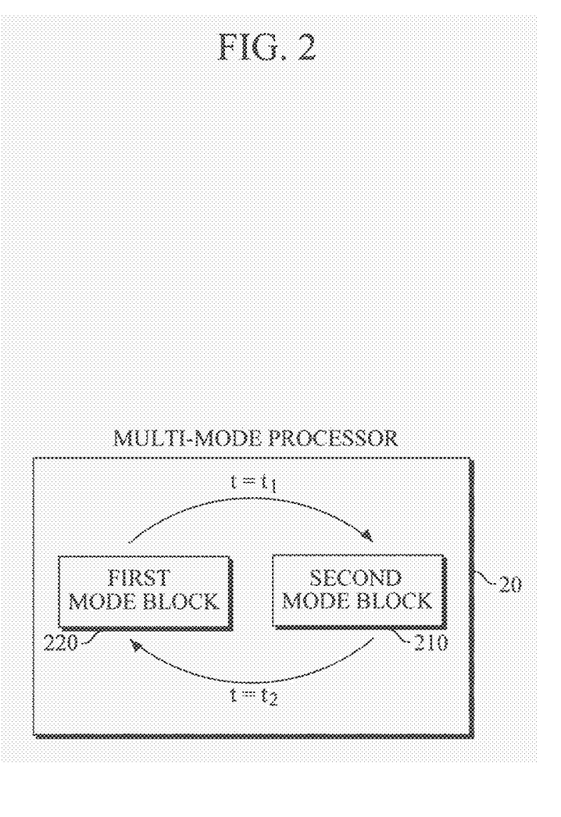
FIG. 2 is a block diagram illustrating an example of a multimode processor generating a mixed-mode program.

FIG. 2 is a block diagram illustrating an example of a multi-mode processor generating a mixed-mode program.

A multi-mode processor 20, configured to have two or more modes and hardware designed to operate in the two or more modes, operates differently in each mode. That is, the multi-mode processor 20 has a first mode block 220 and a second mode block 210 (for example, a CGA mode and a VLIW mode), and the hardware may operate differently in different modes. The multi-mode processor may transition between the first mode block 220 and the second mode block 210 at certain times, or when certain events occur. In an example, the PEs 112 are separated, in that each PEs is designated as belonging to a certain mode. In another example, different compiling mode may share at least a part of or all of the PEs 112, and certain PEs 112 are sometimes used by one mode and sometimes used by another mode.

However, because the hardware configuration and operation methods are different in each mode, the results of a scheduling process and a mapping process may be different between compilers in each mode. Thus, in order for the different modes to run properly with respect to one another with respect to compiled code, it is necessary to reconcile the scheduling and the mapping for compiled code to ensure that the multiple modes share resources in a way so that the modes respect each other's use of resources.

The multi-mode program described in FIG. 2 is a "sequential" program. A sequential program is a program that generates same results regardless of the compiling method or the conditions of execution.

For a program to be "sequential", it is required for the compiling of the program to be able to generate two or more mixed-mode programs producing the same result. Therefore, it is necessary to place restrictions on parts of a program the run in different modes so that the different parts of the program do not interfere with each other's operation in a way that would cause them to lose the property of being a "sequential" program.

Figure 3:
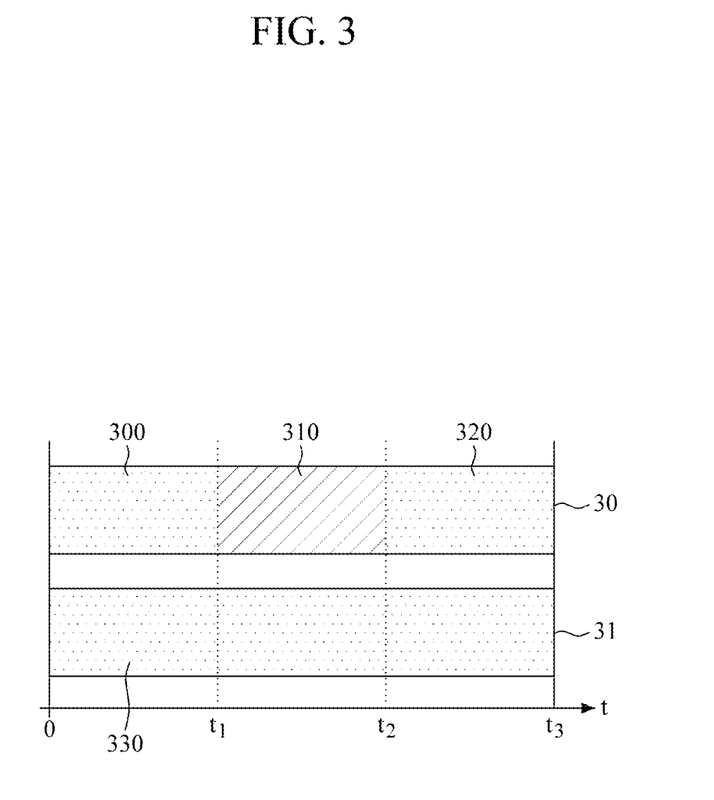
FIG. 3 is a diagram illustrating a two-mode program compiled in the multi-mode processor shown in FIG. 2.

FIG. 3 is a diagram illustrating a two-mode program compiled in the multi-mode processor shown in FIG. 2.

A mixed-mode program 30 is generated by compiling source code from a point in time t=0 to a point in time $t=t_1$ in a first mode, from a point in time $t=t_1$ to a point in time $t=t_2$ in a second mode, and then from a point in time $t=t_2$ to a point in time $t=t_3$ in the first mode. Parts of the program, which are generated by compiling source code during different periods of time, are distinguishable with identification numbers 300, 310 and 320.

Meanwhile, a mixed-mode program 31 is generated by compiling an entire source code in the first mode. In this example, it is assumed that the mixed-mode program 31 has a performance ratio of 1:1 between the first mode and the second mode.

Suppose that the first mode is a VLIW mode and the second mode is a CGA mode. If there is data dependency in a CGA mode, it is hard for a compiler to analyze and process the data dependency. In more detail, if the compiler fails to overcome and enforce the data dependency, a user or programmer cannot even detect an error in binary data mapped in a CGA mode. Accordingly, sometimes an unexpected result occurs during execution of a program. Such runtime errors are detrimental to the proper operation of a program and need to be avoided, as they prevent proper sequential operation of the program.

However, wrong binary data may be generated when the mixed-mode program 30 is mapped in a CGA mode. In order to ascertain whether wrong binary data is being generated, embodiments generate reference data that allow the embodiments to ensure that the binary data is correct. For example, embodiments use the following approach. In order to validate the binary data, embodiments generate a mixed-mode program 31 by compiling a source code of the mixed-mode program 30 in the least error prone mode, for example VLIW mode, and then compare binary data of the mixed-mode program 31 with the binary data of the mixed-mode program 30 mapped in a CGA mode. Because mixed-mode program 31 is less error prone, if the low-level data of the mixed-mode program 30, which is an object for verification, is consistent with that of the mixed-mode program 31, which is a reference, it is possible to determine that there is no error in the mixed-mode program 30. Alternatively, the comparison can also establish the source of an error, if there is an error.

Figure 4:
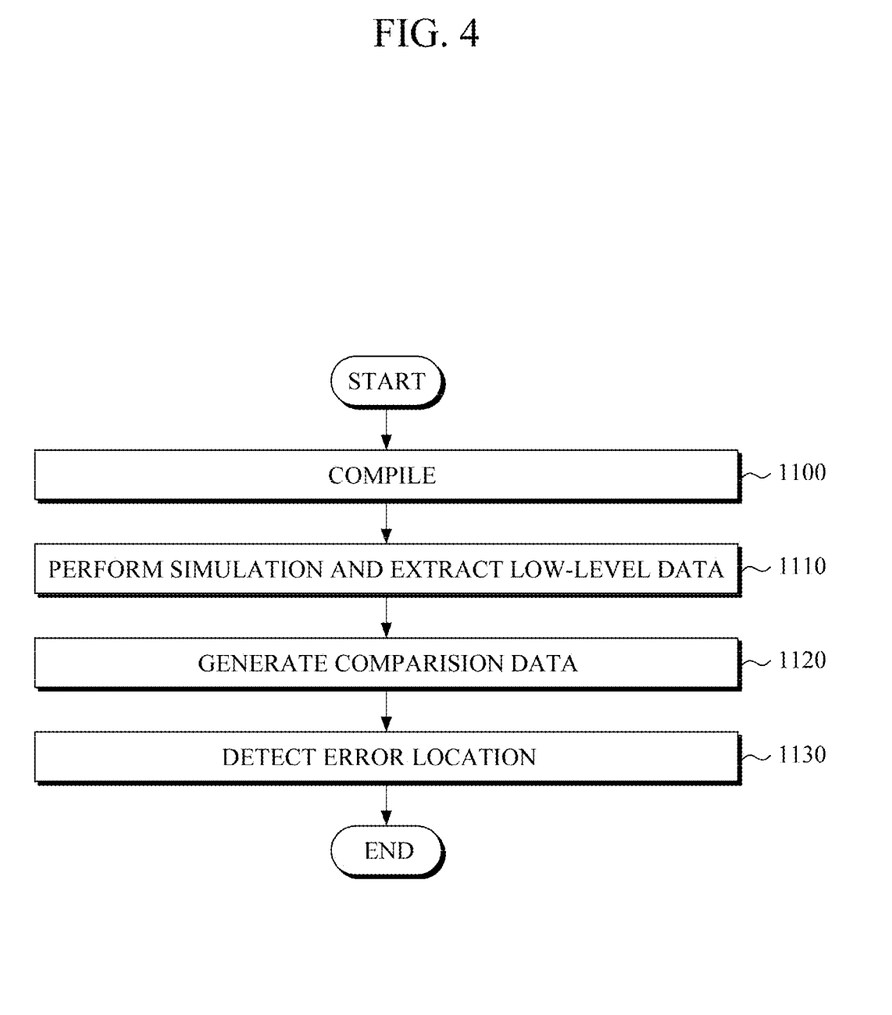
FIG. 4 is a flowchart illustrating an example of a method for detecting a source code error in a mixed-mode program according to an embodiment.

FIG. 4 is a flowchart illustrating an example of a method for detecting a location of a source code error in a mixed-mode program according to an embodiment.

Referring to FIG. 4, the method for detecting a location of a source code error in a mixed-mode program includes compiling 1100, performing simulation and extracting low-level data 1110, generating comparison data 1120, and detecting an error location 1130.

In operation 1100, a source code, that is, high-level data, is compiled in the first mode to thereby generate a verification program, whereas the same source code is compiled in the second mode to thereby generate a reference program. In some embodiments, an operation 1105 (not shown) of generating a mapping table indicating a relationship between high-level data and low-level data is be further performed to aid in subsequent processing.

In operation 1110, essential low-level data is extracted from each of the verification program and the reference program during simulation. At this time, some embodiments extract low-level data from each program of a predetermined period of time instead of the entire simulation period. The low-level data may be extracted from a predetermined period of time because only one time period may be a time period in which the mode used in the verification program is a mode which requires verification, and the validity of code outside of that time period may not be questioned.

In operation 1120, the low-level data, extracted from each of the verification program and the reference program during simulation operation 1120, are converted to a form suitable for comparison. Some embodiments require this operation because low-level data extracted in different modes without data conversion is are not suitable for comparison in those embodiments. The data conversion is performed at a time when low-level data is mapped onto the mapping table generated in operation 1110.

In operation 1130, a mapping table, that is, an 'verification mapping table', onto which low-level data extracted from the verification program is mapped, is compared with a mapping table, that is, a 'reference mapping table', onto which low-level data extracted from the reference program is mapped, to thereby determine whether there is an inconsistency of corresponding data between the two mapping tables. If an inconsistency of corresponding data is found between the two mapping tables, program location information relating to the inconsistent record of data is obtained. Using the mapping tables onto which low-level data is mapped, it is possible to search for high-level data corresponding to the particular low-level data. That is, it is possible to search for a source code location. In order to do this, for example, mapping techniques, as discussed above, are used so as to determine which part of the source code led to the creation of low-level data associated with the anomaly. Based on identifying this part of the source code, it becomes possible to subsequently inform a user of where problem areas are in the source code for debugging purposes.

Figure 5:
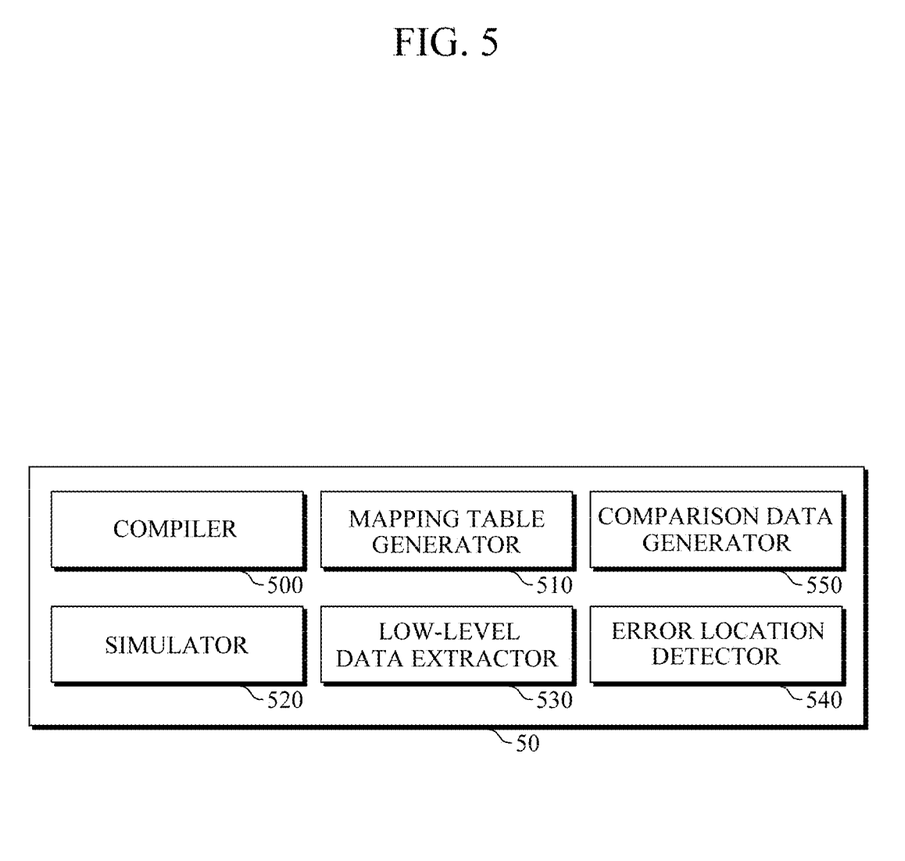
FIG. 5 is a block diagram illustrating an example of an apparatus for detecting a source code error in a mixed-mode program according to an embodiment.

FIG. 5 is a block diagram illustrating an apparatus for detecting a location of a source code error in a mixed-mode program according to an embodiment.

Referring to FIG. 5, an apparatus 50, for detecting a location of a source code error in a mixed-mode program, includes a compiler 500, a mapping table generator 510, a simulator 520, a low-level data extractor 530, a comparison data generator 540, and an error-location detector 550.

The compiler 500 generates a sequential mixed mode program by compiling source code, that is, high-level data.

When the compiler 500 generates the mixed-mode program, the mapping table generator 510 generates a mapping table related to a mode, which is designated for the mixed-mode program.

A mapping table indicates how high-level data is converted by the compiler 500. If it is difficult to generate a mapping table, the compiler 500 may reduce a level of optimization. Operations for optimization include deletion, value change, and order change.

In addition, a mapping table includes instruction mapping information, register mapping information, and memory mapping information. Furthermore, in some embodiments, the mapping table includes information about time slots with valid mapping information. By recording this information in the mapping table, it is possible to track data dependencies between the source code and the low-level data in a way that helps establish whether there are potential issues with data dependencies.

The simulator 520 simulates the verification program and the reference program. By simulating the verification program and the reference program, it is possible to ascertain what the effects of the programs are by capturing low-level data produced as the programs are run.

The low-level data extractor 530 extracts low-level data from each of the verification program and the reference program during simulation by the simulator 520.

The low-level data extractor 530 it is possible to extract low-level data corresponding to a part of, not the entire, time period of the simulation during simulation. As discussed with respect to operation 1110 above, in some embodiments only a portion of the time period being simulated is necessary to the analysis process.

The extracted low-level data may include information about various storages and operations that characterize the operation of the hardware as the verification program and the reference program are simulated. As part of the simulation process, the verification program and the reference program process data, and as part of the processing of the data, information is transferred to and from the register file 111 and the memory 120. The extracted low-level data captures this information flow. For example, the extracted low-level data may include register data and memory data. In addition, the extracted low-level data may include a memory access history, such as an address and data of a memory. Furthermore, the extracted low-level data may include information indicating a location of particular data in a program, such as program counter (PC) and iteration counter. By tracking this data, embodiments are able to assess what information effects result from executing the verification program and the reference program as part of a simulation.

The comparison data generator 540 converts low-level data, extracted from each of the verification program and the reference program during simulation, to a form suitable for comparison. For example, embodiments mapping tables for the verification program and the references program. In order to perform the comparisons, the comparison data generator compiles the low-level data into mapping tables so that the mapping tables may be used in the comparison process.

The data conversion of low-level data is performed by mapping low-level data extracted by the low-level data extractor 530 onto a mapping table generated in the mapping table generator 510.

The error location extractor 550 compares a verification mapping table with a reference mapping table to thereby determine whether there is an inconsistent record of data between the two mapping tables. Such an inconsistent record of data indicates that there may be a problem that needs to be debugged, such as a data dependency issue.

If an inconsistent record of data is found between the two mapping tables, program location information relating to the inconsistent record of data is obtained.

As such, using the mapping tables onto which low-level data is mapped, it is possible to search for high-level data corresponding to the low-level data. That is, it is possible to search for a location of source code that leads to a problem in the low-level code. For example, in the event that a PC value of extracted low-level data is mapped onto a reference mapping table, if an inconsistency is found between the PC value in the verification mapping table and the PC in the reference mapping table, it is possible to find out a location of a code that accesses a specific part of a memory, in which the inconsistency is found.

Figure 6:
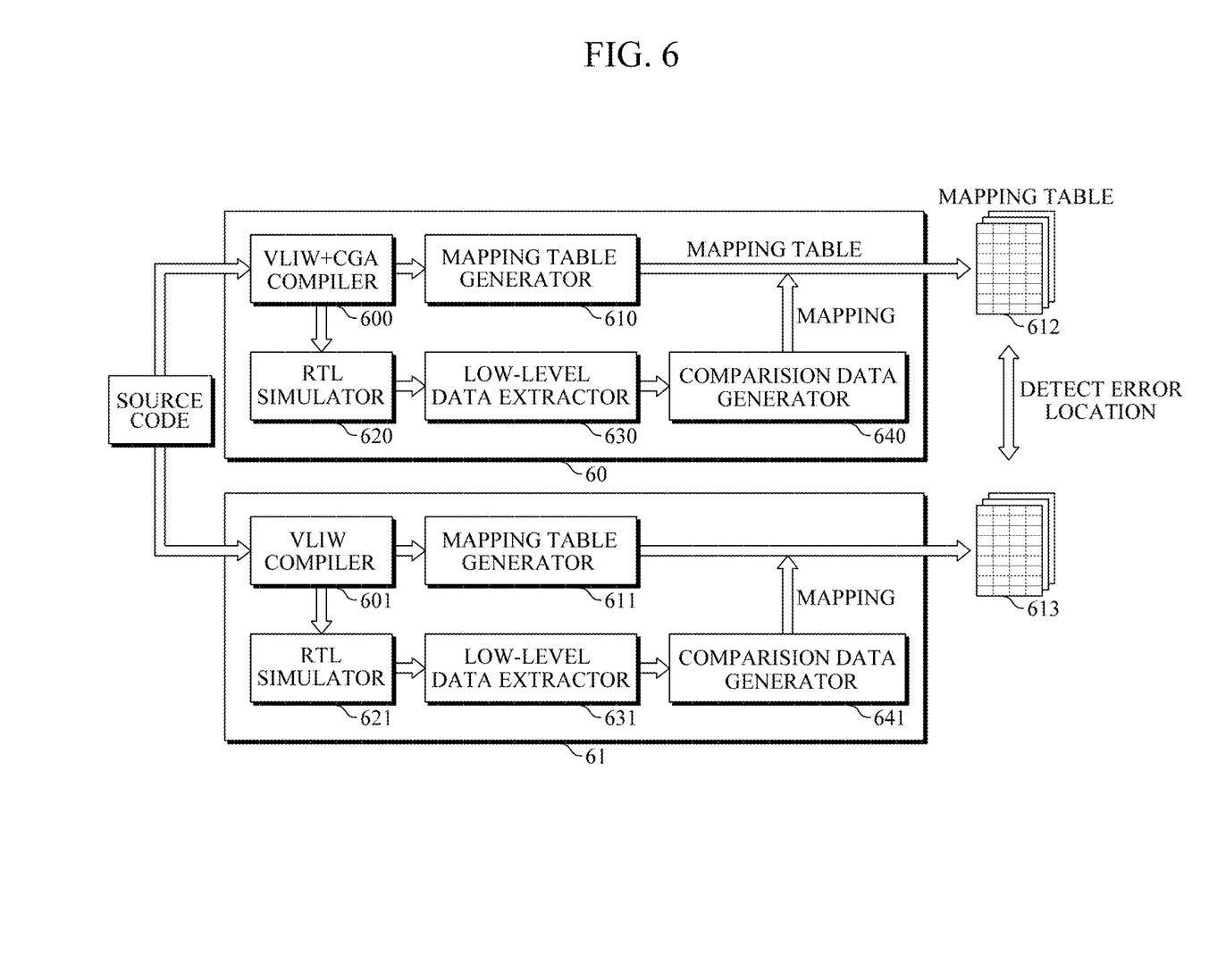
FIG. 6 is a diagram illustrating an example of an error location detecting processing performed by an apparatus for detecting a source code error in a mixed-mode program.

FIG. 6 is a diagram illustrating an example of a procedure for detecting an error location by an apparatus for detecting a location of a source code error in a mixed-mode program.

In the embodiment of FIG. 6, a multi-mode processor is configured to have both a VLIW mode and a CGA mode.

In addition, a verification program is a program compiled both in a VLIW mode and in a CGA mode, whereas a reference program is a program compiled only in a VLIW mode.

In an embodiment, apparatuses 60 and 61 for detecting a location of a source code error are structured to be physically the same apparatus. However, other embodiments may include additional or different structural elements in apparatuses 60 and 61. However, it is assumed that apparatus 60 indicates an apparatus in a VLIW-plus-CGA mixed-mode, whereas the apparatus 61 indicates an apparatus in a VLIW mode. In addition, a program compiled in a VLIW and CGA mixed-mode is a verification program, whereas a program compiled only in a VLIM mode is a reference program. The compilation process assumes that the reference program produced in VLIM mode will be a correct standard to ensure that the VLIW and CGA mixed-mode verification program is a sequential program.

Each of compilers 600 and 601 compiles source code to thereby generate a program.

If a compiled source code has a loop section, the loop section is preprocessed for a pre-optimization and then mapped on a CGA structure. Due to the pre-optimization, an output of the CGA-mapped code may be different from an output of a loop included in the source code. Therefore, it is impossible to obtain a reference output of the CGA-mapped code by performing host compiling and simulation. However, in the embodiment of FIG. 6, a reference value is obtained by mapping equivalent source code, which was mapped in a CGA mode, in a VLIW mode. Therefore, by comparing data extracted during VLIW and CGA mixed-mode simulation with data extracted during VLIW mode simulation, data verification may be possible because if the VLIW and CGA mixed-mode simulation matches the results of the VLIW mode simulation, it indicates that the VLIW and CGA mixed-mode mapping has not violated any data dependencies.

In the VLIW-plus-CGA mixed-mode compiler 600, output data of the source code that was mapped in a CGA mode is mapped in a VLIW mode. The mapping table generators 610 and 611 generate a register allocation mapping table for resultant output data.

When mapping a source code in a VLIW mode, unlike when mapping a source code in a CGA mode, a write memory access may occur due to a virtual register spill. In such a case, any extracted data should not be used for comparison. Thus, a mapping table for a VLIW-only mode may include further information in the program counter and the function unit index, indicating whether an instruction to be executed at a specific is due to a register spill or for accessing a variable in a memory.

When Register Transistor Logic (RTL) simulators 620 and 621 are performing simulations, each of the low-level data extractors 630 and 631 extracts an address and a value for every write memory access. In the VLIW-only mode, the low-level data extractor 631 further extracts a PC value and FU indexes at every memory access. Upon termination of the simulation, the low-level data extractors 630 and 631 extract the final values of physical registers received from the compilers 600 and 601, respectively.

In the case that several data for write memory access to the same address, comparison data generator 640 and 641 records only the data of the final write memory access. In the VLIW mode, the comparison data generator 641 extracts a PC value and a FU index, but doesn't extract values for write memory access due to a virtual register spill.

Meanwhile, the order of read access and write access does not change with regard to the same address. Thus, if the order of values in each address is compared with one another, it is possible to find a memory dependency violation.

Meanwhile, in a VLIW mode, information is added indicating whether a write memory access to a mapping table occurs due to a register spill. In addition, if a location of memory dependency violation is found, a location of a source code, such as, for example, a file name and a line number of the source code, corresponding to a PC value or a FU index may be provided. In this way, a user may find a line number of the source code in which the error has occurred. Once this information is available to the user, the user may then use it to help in a debugging process to address potential errors or bugs in the code that may have created the problems. Furthermore, register information or memory location information onto which a loop index is mapped may further be provided.

The Register Translation Logic (RTL) simulators 620 and 621 extract an address relating to a read/write access to memory. In the VLIW mode, a PC value, index information of FUs to be executed, a value of a register to which a loop index is mapped, or a memory location value are stored together.

Figure 7:
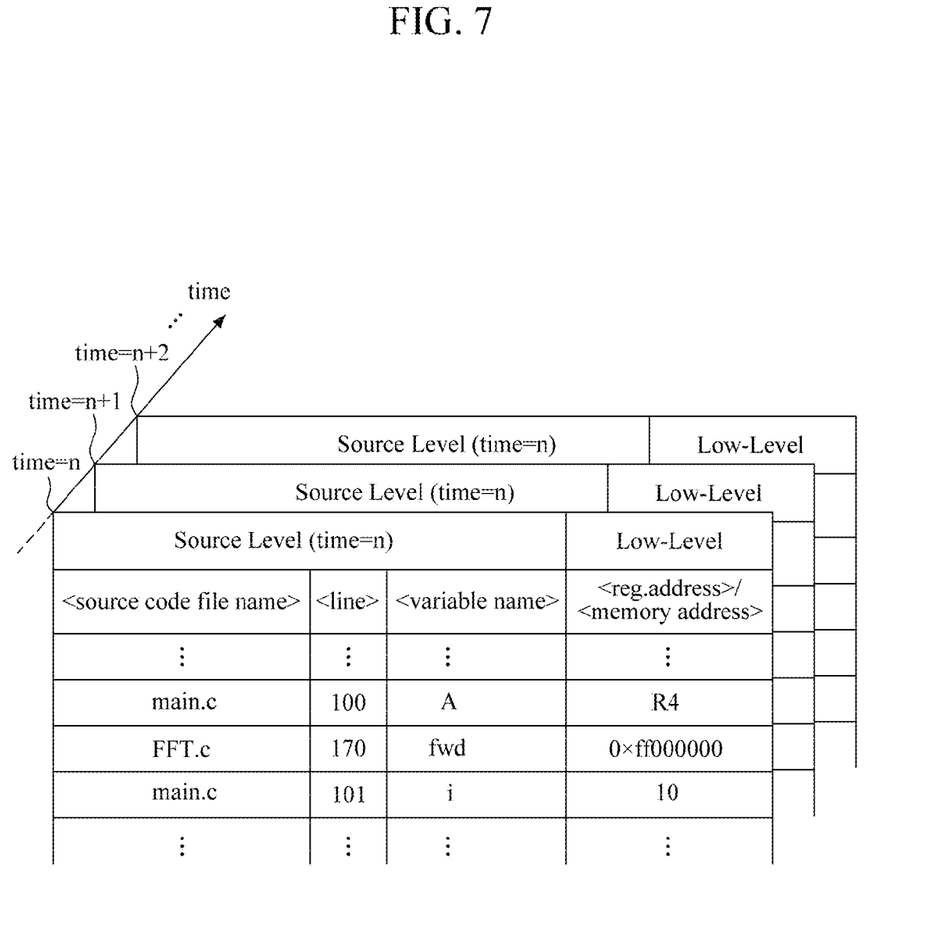
FIG. 7 is a diagram illustrating an example of a mapping table.

FIG. 7 illustrates an example of a mapping table.

Referring to FIG. 7, a mapping table stores information relating high-level data to low-level data. In an example, high-level data includes a file name, a row number, and a variable name of a source code. The high-level data relates to a specific PC at certain times (PC=n, n+1, n+2) and low-level data, such as a register address and a memory address.

Figure 8:
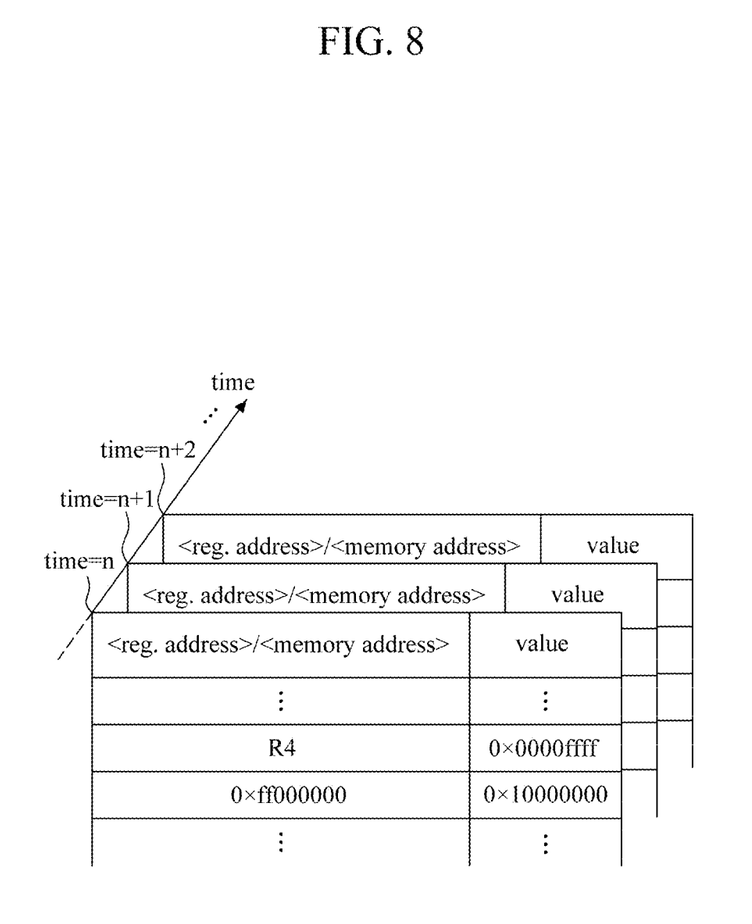
FIG. 8 is a diagram illustrating an example of extracted low-level data.

FIG. 8 illustrates examples of extracted low-level data.

As illustrated in FIG. 8, values and PC's are mapped to each register address (or memory address) for each cycle (cycle=n, n+1, n+2, . . . ).

Figure 9:
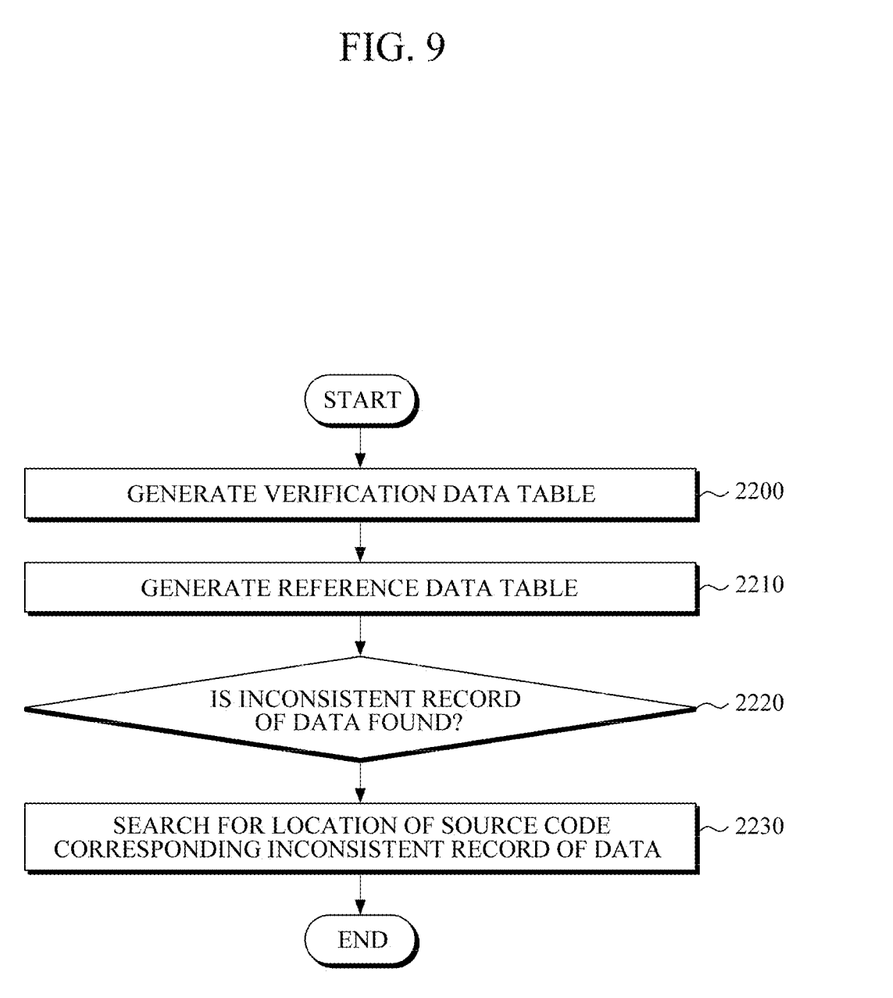
FIG. 9 is a flowchart illustrating an example of a method for detecting a location of a source code error in a mixed-mode program according to another embodiment.

FIG. 9 is a flow chart illustrating an example of a method for detecting a source code error location in a mixed-mode program according to another embodiment.

Referring to FIG. 9, the method for detecting a location of a source code error in a mixed-mode program includes: generating a verification data table in operation 2200; generating a reference data table in operation 2210; comparing the verification data table with the reference data table in operation 2220; and detecting an error location in operation 2230.

In operation 2200, a verification data table is generated by mapping low-level data of a verification program compiled in a first mode onto a mapping table relating to the verification program. Example mapping tables have been shown at FIGS. 7-8. The mapping table may be generated when the verification is being compiled, and the low-level data may be extracted from the verification program during simulation.

The low-level information includes, for example, register and/or memory address information and the value with which the register or memory is associated at a given time. Embodiments are able to determine which high-level instructions in the source code lead to these low-level changes.

In operation 2210, a reference data table is generated by mapping low-level data of a reference program compiled in a second mode onto a mapping table relating to the reference program. The reference data table is generated in a similar manner to the way in which the verification data table is generated in operation 2200.

In operation 2220, embodiments determine whether there is an inconsistent record of data between the verification data table and the reference data table is determined by comparing the verification data table with the reference data table. If there is no inconsistency, the embodiment has established that the code to be verified has been verified against the reference.

In the case that an inconsistent record is found, in operation 2230, program location information relating to the inconsistent record is obtained using a PC value and a FU index.

Therefore, if an error occurs, a user may be provided with information indicating a line number of the source code that triggers the error. Such information allows the user to inspect the code or otherwise use debugging tools in order to correct the error.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting a source code error location in a mixed-mode program, comprising:
   a compiler, stored in a memory, configured to generate a first program by compiling source code in a first mode of a reconfigurable processor, and a second program by compiling source code in a second mode of the reconfigurable processor;
   a mapping table generator configured to generate a first mapping table for the first program, and a second mapping table for the second program;
   a simulator configured to simulate the first program and to simulate the second program;
   a low-level data extractor configured to extract first low-level data from the simulation of the first program, and to extract second low-level data from the simulation of the second program;
   a comparison data generator configured to map the first low-level data onto the first mapping table generated from the first program to generate a verification mapping table, and to map the second low-level data onto the second mapping table generated from the second program to generate a reference mapping table, wherein each of the first mapping table and the second mapping table comprises at least two of instruction mapping information, register mapping information, and memory mapping information; and
   an error location detector configured to compare the verification mapping table with the reference mapping table to detect an inconsistent record of data between the verification mapping table and the reference mapping table, and obtain program location information relating to the inconsistent record of data.

2. The apparatus of claim 1, wherein the low-level data extractor is configured to extract low-level data from each of the first program and the second program for a predetermined time period during simulation.

3. The apparatus of claim 1, wherein the low-level data comprises at least one of register data, memory data, program counter (PC), and iteration counter.

4. The apparatus of claim 3, wherein the error location detector detects, based on the program counter, a location of the source code that causes an error.

5. A method, executed by a processor, for detecting a location of a source code error in a mixed-mode program, comprising:
generating a verification program by compiling the source code in a first mode of a reconfigurable processor;
generating a reference program by compiling the source code in the second mode of the reconfigurable processor;
generating a first mapping table for the verification program;
generating a second mapping table for the reference program;
simulating the verification program;
simulating the reference program;
extracting low-level data from the simulation of the verification program;
extracting low-level data from the simulation of the reference program;
mapping the low-level data extracted from the verification program onto the first mapping table indicating a relationship between the source code and the verification program, to generate a verification mapping table, wherein the verification mapping table comprises at least two of instruction mapping information, register mapping information, and memory mapping information;
mapping the low-level data extracted from the reference program onto the second mapping table, to generate a reference mapping table, wherein the reference mapping table comprises at least two of instruction mapping information, register mapping information, and memory mapping information; and
comparing the verification mapping table with the reference mapping table to detect an inconsistent record of data and obtain program location information relating to the inconsistent record of data.

6. The method of claim 5, wherein the first verification mapping table indicates a relationship between the source code and a verification program, and the second mapping table indicates a relationship between the source code and the reference program.

7. A method, executed by a processor, for detecting a location of a source code error in a mixed-mode program, comprising:
generating a verification program by compiling the source code in a first mode of a reconfigurable processor;
generating a reference program by compiling the source code in the second mode of the reconfigurable processor;
generating a verification data table, comprising low-level data of the verification program, wherein the generating of the verification data table is performed by mapping low-level data of the verification program, which is compiled in the first mode, onto a mapping table for the verification program;
generating a reference data table, comprising low-level data of the verification program, wherein the generating of the reference data table is performed by mapping low-level data of the reference program, which is compiled in the second mode onto a mapping table for the reference program,
wherein the second mode is different from the first mode, and
wherein each of the mapping table for the verification program and the mapping table for the reference program comprise at least two of instruction mapping information, register mapping information, and memory mapping information;
comparing the verification data table with the reference data table so as to determine whether there is an inconsistent record of data; and
detecting a location corresponding to the inconsistent record of data, if it exists, in the source code based on a program counter (PC) and a Functional Unit (FU) index.

8. The method of claim 7, further comprising:
extracting the low-level data of the verification program from the verification program during simulation.

9. The method of claim 7, further comprising:
extracting the low-level data of the reference program from the reference program during simulation.

10. An apparatus for validating source code in a mixed-mode program, comprising:
a compiler stored in a memory configured to generate a first program by compiling the source code in a first mode of a reconfigurable processor, and a second program by compiling the source code in a second mode of the reconfigurable processor;
a mapping table generator configured to generate a first mapping table for the first program, and a second mapping table for the second program;
a simulator configured to simulate the first program and the second program;
a low-level data extractor configured to extract first low-level data from the simulation of the first program, and to extract second low-level data from the simulation of the second program;
a comparison data generator configured to map the first low-level data onto the first mapping table generated from the first program to generate a verification mapping table, and to map the second low-level data onto the second mapping table generated from the second mapping table to generate a reference mapping table, wherein each of the first mapping table and the second mapping table comprises at least two of instruction mapping information, register mapping information, and memory mapping information; and
an error location detector configured to compare the verification mapping table with the reference mapping table to provide an indication of whether the source code is valid.

11. The apparatus of claim 10, wherein the low-level data extractor is configured to extract low-level data from each of the first program and the second program for a predetermined time period during simulation.

12. The apparatus of claim 10, wherein the low-level data comprises at least one of register data, memory data, program counter (PC), and iteration counter.

13. The apparatus of claim 1, wherein the first mode is a CGA (Coarse-Grained Array) mode, and the second mode is a VLIW (Very Long Instruction Word) mode.

14. The apparatus of claim 10, wherein the first mode is a CGA (Coarse-Grained Array) mode, and the second mode is a VLIW (Very Long Instruction Word) mode.

* * * * *